US009691039B2

(12) United States Patent
Cherian et al.

(10) Patent No.: US 9,691,039 B2
(45) Date of Patent: Jun. 27, 2017

(54) SMART ORDERING SYSTEM FOR PROACTIVE MITIGATION OF SYSTEM SCARCITY IN A CLOUD OR DATA CENTER ENVIRONMENT

(71) Applicant: Dell Products L.P., Round Rock, TX (US)

(72) Inventors: Austin Cherian, Bangalore (IN); Shuvan Saha, Bangalore (IN); Sindhu Kumara Murthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1112 days.

(21) Appl. No.: 13/627,068

(22) Filed: Sep. 26, 2012

(65) Prior Publication Data

US 2014/0089221 A1    Mar. 27, 2014

(51) Int. Cl.
*G06F 15/173* (2006.01)
*G06Q 10/06* (2012.01)
*G06Q 10/08* (2012.01)
*G06F 9/50* (2006.01)

(52) U.S. Cl.
CPC .......... *G06Q 10/06* (2013.01); *G06F 9/5011* (2013.01); *G06Q 10/08* (2013.01); *G06F 2209/5011* (2013.01)

(58) Field of Classification Search
CPC ............. G06F 9/5061; G06F 17/30557; G06F 9/45533; G06Q 10/087; G06Q 10/00; G06Q 10/08
USPC ................... 709/226; 707/999; 705/28, 341; 726/12; 718/1
See application file for complete search history.

(56) References Cited

U.S. PATENT DOCUMENTS

| 6,738,773 B1 * | 5/2004 | Reunert ............ G06F 17/30557 |
| 7,475,026 B2 | 1/2009 | Rock, Jr. et al. |
| 7,577,591 B2 | 8/2009 | Dhawan |

(Continued)

FOREIGN PATENT DOCUMENTS

JP     2012058815 A  *  3/2012  ............... G06F 9/50

OTHER PUBLICATIONS

Atwood, Jeff, "Server Hosting—Rent vs. Buy?", Dec. 9, 2008, blog.stackoverflow.com, 19 pages.*

(Continued)

*Primary Examiner* — Shannon Campbell
*Assistant Examiner* — Freda A Nelson
(74) *Attorney, Agent, or Firm* — Terrile, Cannatti, Chambers & Holland, LLP; Stephen A. Terrile

(57) ABSTRACT

A system, method, and computer-readable medium are disclosed for automating the procurement of a physical server when the remaining number of available servers in a server pool reaches a predetermined threshold value. A target server pool is monitored for commitment of its associated physical servers. If the number of available servers falls below a predetermined threshold, then an automated procurement template associated with the target server pool is retrieved. The automated procurement template is then provided to the physical server manufacturer, which converts the information it contains into manufacturing and delivery data. In turn, the manufacturing data is used to manufacture the physical server, which is then delivered to the customer for implementation.

12 Claims, 6 Drawing Sheets

(56) References Cited

U.S. PATENT DOCUMENTS

| | | | |
|---|---|---|---|
| 2002/0083164 A1* | 6/2002 | Katayama | G06Q 10/087 709/223 |
| 2005/0228856 A1* | 10/2005 | Swildens | G06F 9/50 709/200 |
| 2009/0019535 A1* | 1/2009 | Mishra | G06Q 10/00 726/12 |
| 2009/0172168 A1* | 7/2009 | Sonoda | G06F 9/5061 709/226 |

OTHER PUBLICATIONS

White Paper: Enterprise IT Hardware Procurement: Cracking the Code: gep, twitter.com, Alex casteroneves@acnn1—Aug. 10, 2011, 12 pages.*

LANDesk® Solution Brief—LANDesk® Process Manager Automating Server Procurement for More Cost-Effective Software Development, 2008, 14 pages.*

White Paper: Enterprise IT Hardware Procurement: Cracking the Code: gep, twitter.com, Alex casteroneves@acnn1—Aug. 10, 2011,12 pages.*

Atwood, Jeff, "Server Hosting—Rent vs. Buy?", Dec. 9, 2008 , blog.stackoverflow.com, 19 pages.*

\* cited by examiner

SMART ORDERING SYSTEM FOR PROACTIVE MITIGATION OF SYSTEM SCARCITY IN A CLOUD OR DATA CENTER ENVIRONMENT

BACKGROUND OF THE INVENTION

Field of the Invention

The present invention relates to the management of information handling systems. More specifically, embodiments of the invention provide a system, method, and computer-readable medium for automating the procurement of a physical server when the remaining number of available servers in a server pool reaches a predetermined threshold value.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of such information handling systems in cloud computing, which delivers the use of hardware and software computing resources as a service over a network, has become increasingly popular in recent years. At its core, cloud computing is based upon the concept of leveraging a converged infrastructure and shared services to achieve coherence and economies of scale. As such, cloud computing is typically implemented in centralized or distributed data center environments that are managed to maximize resource availability and reliability.

One aspect of cloud computing is the use of virtualization, which allows a single resource, such as a server, an operating system, an application, or storage device appear to function as multiple logical resources. Conversely, virtualization can also make multiple physical resources, such as storage devices or servers, appear as a single logical resource. In general, virtualization of physical resources is managed through a management console, such as a virtual machine manager (VMM), implemented on physical servers. These management consoles allow multiple operating systems, typically referred to as guests, to run concurrently on a host computer and operate as virtual servers.

One advantage to virtualization is the ability of a VMM to assign the most appropriate mix of hardware and software resources to each virtual server. As a result, the utilization of a data center's service infrastructure can be optimized. However, while VMMs and other management consoles are effective at managing the assignment of available resources, they lack the ability to proactively predict the need for additional physical servers and automatically initiate their procurement. Furthermore, there is currently no known approach to automating the configuration and customization of such a servers prior to initiating the procurement process.

SUMMARY OF THE INVENTION

A system, method, and computer-readable medium are disclosed for automating the procurement of a physical server when the remaining number of available servers in a server pool reaches a predetermined threshold value. In various embodiments, the threshold value corresponds to a scarcity level of available servers. In these and other embodiments, an automated server procurement system processes an automated server procurement template to initiate the procurement of a physical server when the threshold value is reached. In various embodiments, the automated server procurement template comprises a system hardware profile and a customer billing and shipping profile. In these and other embodiments, the system hardware profile comprises a system hardware component inventory of a target physical server and the billing and shipping profile comprises customer billing and delivery information. In certain embodiments, the automated server procurement system prompts a user to initiate procurement of a physical server with a manually-generated server procurement order when the threshold value is reached. In these and other embodiments, a server procurement order is displayed within a user interface, where it is populated by the user. Once populated, it is then used to manually initiate the procurement of a physical server.

In various embodiments, automated server procurement operations are initiated by first selecting a target server pool. Once selected, the target server pool is monitored for commitment of available physical servers. The target server pool is then polled to generate a server availability value, which is equivalent to the number of physical servers in the target server pool that are not currently committed. A determination is then made whether the server availability value is less than a procurement threshold value, which is equivalent to the lowest number of available physical servers to be maintained in the target server pool.

If so, then the automated procurement template implemented for the target server pool is retrieved and a determination is made whether its associated system hardware profile has been populated. If not, it is populated by duplicating the hardware component inventory of a predetermined physical server that is a member of the target server pool. The automated server procurement template is then provided to the physical server manufacturer, which converts the information it contains into manufacturing data. In turn, the manufacturing data is used to manufacture the physical server, which is then delivered to the customer for implementation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for automating the procurement of a physical server when the remaining number of available servers in a server pool reaches a predetermined threshold value. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
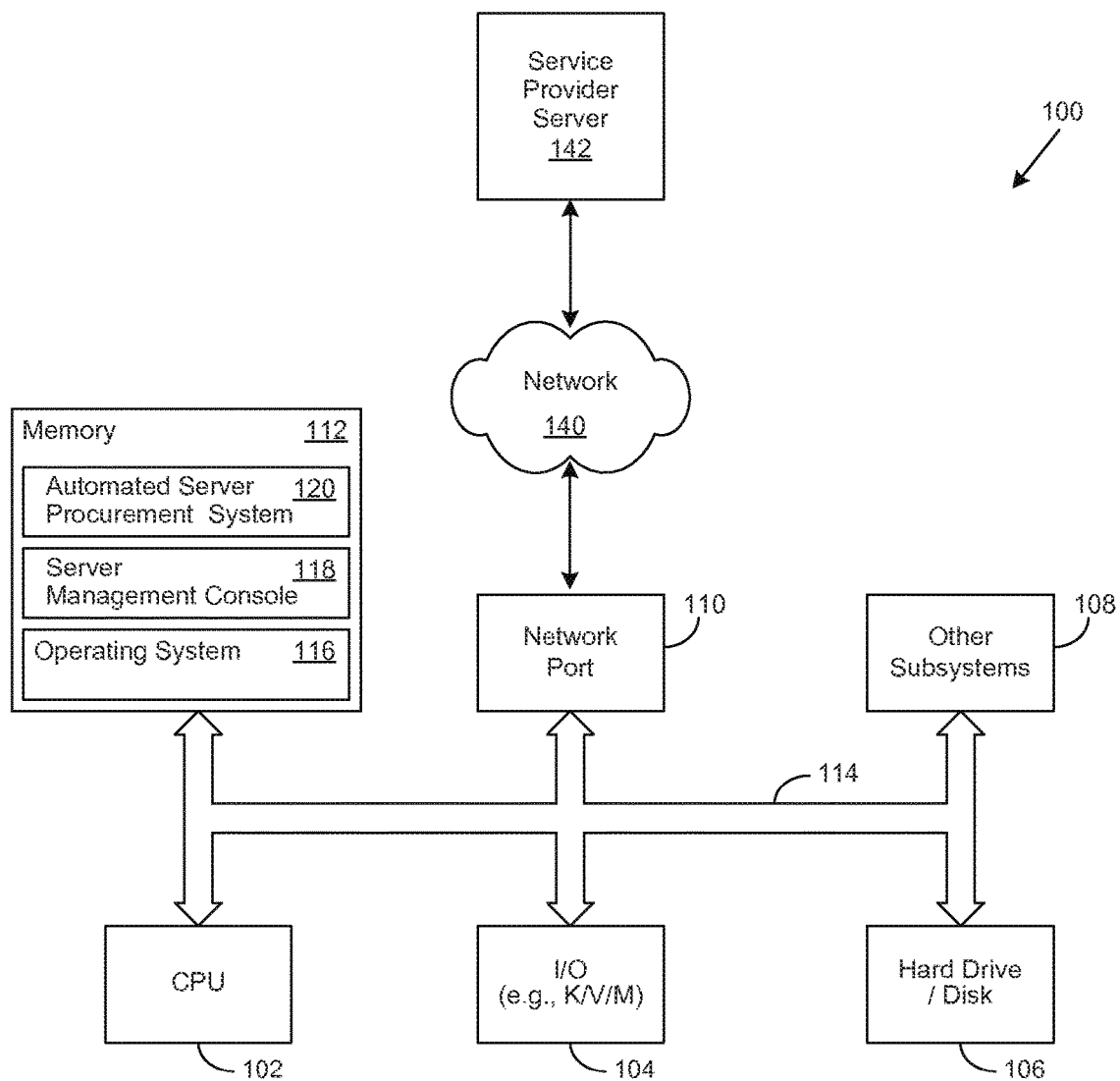
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a server management console 118 and an automated server procurement system 120. In one embodiment, the information handling system 100 is able to download the server management console 118 and the automated server procurement system 120 from the service provider server 142. In another embodiment, the server management console 118 and the automated server procurement system 120 is provided as a service from the service provider server 142.

Figure 2:
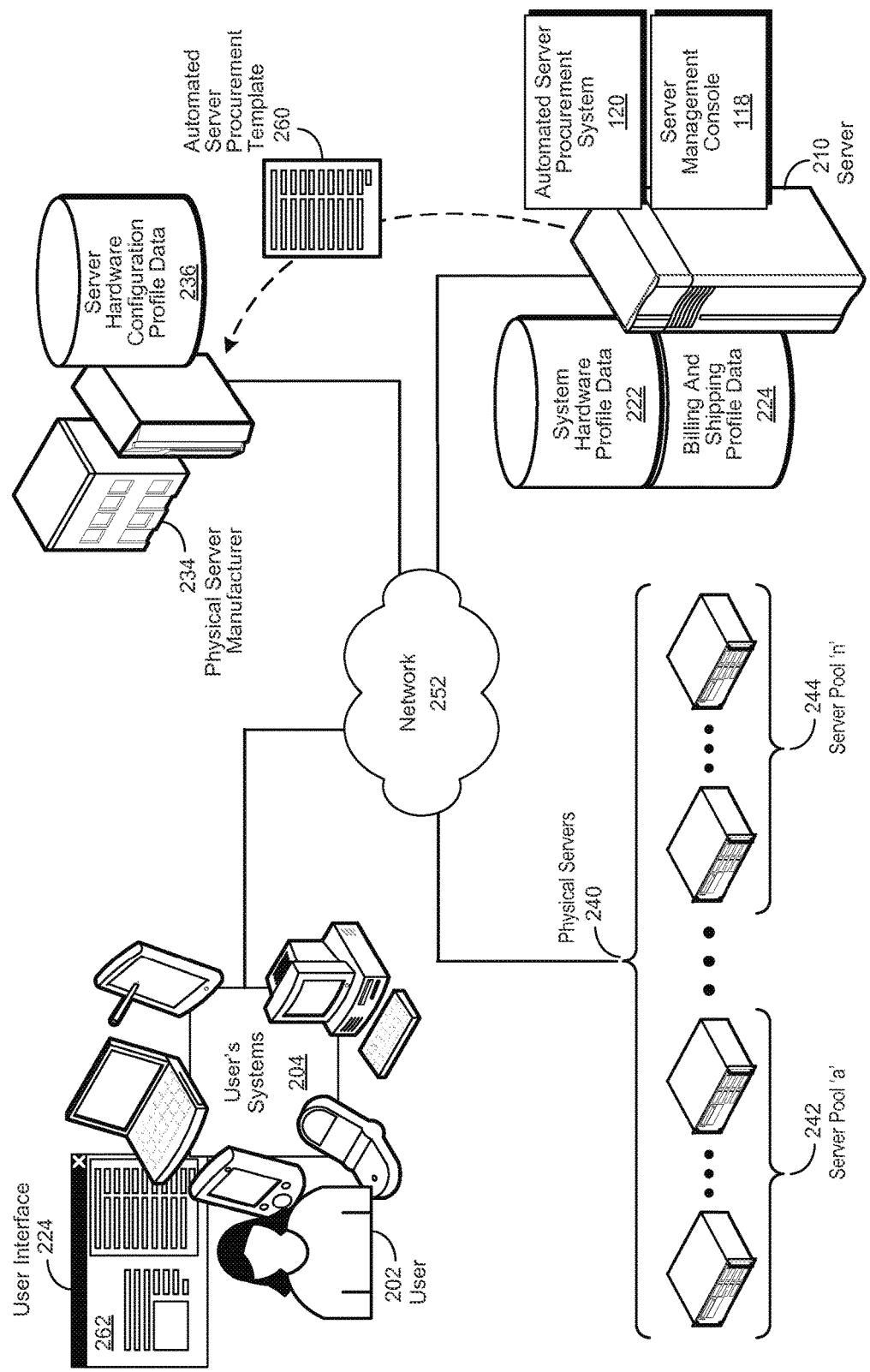
FIG. 2 is a simplified block diagram of the performance of automated physical server procurement operations.

FIG. 2 is a simplified block diagram of the performance of automated physical server procurement operations as implemented in an embodiment of the invention. In this embodiment, an automated server procurement system 120 is implemented to automatically procure a physical server 240 when the remaining number of available servers 240 in a server pool, such as server pools 'a' 242 through 'n' 244, reach a predetermined threshold value. In various embodiments, the threshold value corresponds to a scarcity level of available servers. In these and other embodiments, the automated server procurement system 120 processes an automated server procurement template 260 to initiate the procurement of a physical server 240 when the threshold value is reached. In certain embodiments, the automated server procurement system 120 prompts a user 202 to initiate procurement of a physical server with a manually-generated server procurement order 262 when the threshold value is reached. In these and other embodiments, a server procurement order 262 is displayed within a user interface 224, where it is populated by the user 202. Once populated, it is then used to manually initiate the procurement of a physical server 240.

In various embodiments, the automated server procurement system 120 comprises a repository of system hardware profile data 222 and a repository of billing and shipping profile data 224. In these and other embodiments, the automated server procurement system 120 may be implemented on one or more servers 210, which are connected to a network 252. In certain of these embodiments, the automated server procurement system 120 may be implemented in conjunction with a server management console 118, familiar to those of skill in the art, which is likewise implemented on one or more servers 210 connected to a network 252. In various embodiments, the network 252 may comprise a public network, such as the Internet, a physical private network, a virtual private network (VPN), or any combination thereof.

As used herein, a physical server 240 broadly refers to a physical information handling system dedicated to running one or more services as a host that serves the needs of users of other computers on a network 252. In various embodiments, a physical server may be dedicated to a single service, such as serving as a database server, a file server, an email server, a print server, a web server, a gaming server, or some other kind of server. In certain embodiments, a physical server 240 may likewise provide the underlying hardware and operating environment to support one or more virtual machines familiar to those of skill in the art, who will likewise recognize that many such embodiments are possible. Accordingly, the foregoing is not intended to limit the spirit, scope or intent of the invention.

Referring now to FIG. 2, automated server procurement operations are initiated by first selecting a target server pool 'a' 242 through 'n' 244. As used herein a target server pool broadly refers to a logical grouping of one or more physical servers 240. Once the target server pool 'a' 242 through 'n' 244 is selected, it is monitored for commitment of available physical servers 240. As used herein, an available physical server 240 refers to a physical server 240 that is not currently committed, scheduled to be committed, or is being held in reserve for future commitments to provide one or more services. As likewise used herein, such commitment may also be referred to as physical server 240 "consumption," "exhaustion" or "provision." The target server pool 'a' 242 through 'n 244 is then polled to generate a server availability value, which is equivalent to the number of physical servers 240 in the target server pool 'a' 242 through 'n 244 that are not currently committed.

A determination is then made whether the server availability value is less than a procurement threshold value, which is a predetermined value that is equivalent to the lowest number of available physical servers 240 to be maintained in the target server pool 'a' 242 through 'n 244.

In one embodiment, the procurement threshold value is predetermined by a user 202, such as a system administrator. In another embodiment, the procurement threshold value is automatically predetermined through the implementation of predictive analytics approaches familiar to skilled practitioners of the art. In yet another embodiment, the rate at which the number of available physical servers 240 within a target server pool 'a' 242 through 'n 244 is decreasing is used to predict when the procurement threshold value is going to be reached. In various embodiments, the time that it takes for a physical server 240 to be manufactured, delivered and implemented is factored into the procurement threshold value. In certain of these embodiments, the automated server procurement system 118 automatically queries the physical server manufacturer 234 to determine the amount of time that it will take to manufacture and deliver a predetermined physical server 240. In these and other embodiments, manufacturing and shipping duration time intervals provided by the physical server manufacturer 234 are used to determine the procurement threshold value. In certain of these embodiments, the manufacturing and shipping duration time intervals provided by the physical server manufacturer 234 are used to generate a lead time, which is the total amount of time required to manufacture and deliver a physical server. In turn, the lead time is used to determine when a physical server procurement operation is performed to ensure that the physical server is delivered prior to a target delivery date.

If server availability value is less than a procurement threshold value, then a determination is made whether an automated procurement template 260 has been implemented for the target server pool 'a' 242 through 'n 244. In various embodiments, the automated procurement template 260 comprises a system hardware profile and a billing and shipping profile. In various embodiments, the system hardware profile and the billing and shipping profile are respectively stored in the repository of system hardware profile data 222 and the repository of billing and shipping profile data 224. In certain embodiments, the automated procurement template 260 comprises an Extensible Markup Language (XML) document. In these and other embodiments, the system hardware profile comprises a system hardware component inventory of a target physical server 240 as well as associated configuration and customization data. Likewise, the billing and shipping profile comprises customer billing details (e.g., credit card, debiting bank account number, department and cost center identifiers, etc.), along with the customer's shipping address and delivery information.

If an automated procurement template 260 has not been implemented for the target server pool 'a' 242 through 'n 244, then a notification is provided to a user 202, such as a system administrator, to consider procuring additional physical servers. In one embodiment, the alert is displayed within the user interface 224 of the user's system 204. As used herein, the user's system 204 may comprise a personal computer, a laptop computer, a tablet computer, a personal digital assistant (PDA), a mobile telephone, or any other suitable device operable to establish an on-line session with the automated server procurement system 120 over a connection to network 252. In another embodiment, the alert comprises the total number of physical servers 240 in the target server pool 'a' 242 through 'n 244 and the number that are available.

If the user decides to manually procure a physical server 240, then server hardware configuration, customer billing, and associated delivery information is used to manually generate a physical server procurement order. In one embodiment, the server hardware configuration information resides in hardware configuration templates, which in turn reside within the target server pool's management console 118. In another embodiment, the server hardware templates are stored in a repository of server hardware template data 236 and are accessed via a network connection to network 252. In various embodiments, the server hardware templates may be prepopulated, automatically populated, or manually populated when the manual procurement of a physical server 240 is initiated. In these and other embodiments, the server hardware templates may likewise be revised or modified prior at the time the manual procurement of a physical server 240 is initiated. Procurement of physical server 240 is then manually initiated by providing the manually-prepared physical server procurement order to the physical server manufacturer 234.

However, if an automated procurement template 260 has been implemented for the target server pool 'a' 242 through 'n 244, then a determination is made whether the system hardware profile associated with the implemented automated procurement template 260 has been populated. If not, then the system hardware profile is populated by duplicating the hardware component inventory of a target physical server 240, as well as its associated configuration and customization data, that is a member of the target server pool 'a' 242 through 'n 244. In one embodiment, the target physical server 240 is the physical server 240 in the target server pool 'a' 242 through 'n 244 whose resources were most recently committed. Thereafter, of after the system hardware profile is populated, procurement of a physical server 240 is automatically initiated by providing the automated server procurement template 260 to the physical server manufacturer 234. In various embodiments, the automated sever procurement template 260 may be provided through the implementation of Simple Object Access Protocol (SOAP), Representational State (REST)—based services, or Secure Sockets Layer (SSL).

In various embodiments, physical servers are procured in a batch, the size of which may be either manually or automatically determined. As an example, a system administrator may manually determine the number of servers to be procured in a batch. In another embodiment, the number of servers to be procured in a batch may be determined dynamically. For example, if 'x' days are required for manufacturing and delivery, then the number of physical committed in the last 'x' days becomes the batch size for automated procurement.

In certain embodiments, server hardware profile configuration bundles are linked by list type, which knows the predecessor and successor model from the physical server manufacturer 234. As a result, if the current model is not available, the next successor model will automatically be chosen, which removes the need of trying to determine the most appropriate replacement model if the original model of the physical server is no longer available.

Once the automated server procurement template 260 or the manually-generated server procurement order 262 has been respectively provided to the physical server manufacturer 234, it is converted into manufacturing data by the physical server manufacturer 234. In various embodiments, the manufacturing data comprises Stock Keeping Unit (SKU) data. In one embodiment, a physical server configuration and cost quote is generated and provided to the customer for approval. The manufacturing data is then used by the physical server manufacturer 234 to manufacture the physical server 240, which is then delivered to the customer and subsequently implemented in the appropriate server pool 'a' 242 through 'n' 244.

From the foregoing, it will be appreciated that the invention advantageously provides a data-driven approach to systematically procure a physical server. As such, it allows a customer to procure what (e.g., a custom-built, dynamic physical server configuration), when (e.g., through proactive physical server scarcity detection), where (e.g., through intelligent ordering and delivery), and quantity (e.g., according to the rate of physical server commitment) required without manual intervention. It will likewise be appreciated that the invention removes the need for a customer to manually store existing physical server configuration and customization information during a physical server procurement cycle. Likewise, the ability to integrate the invention with known server management consoles provides further efficiencies in the management of data centers.

Figure 3A:
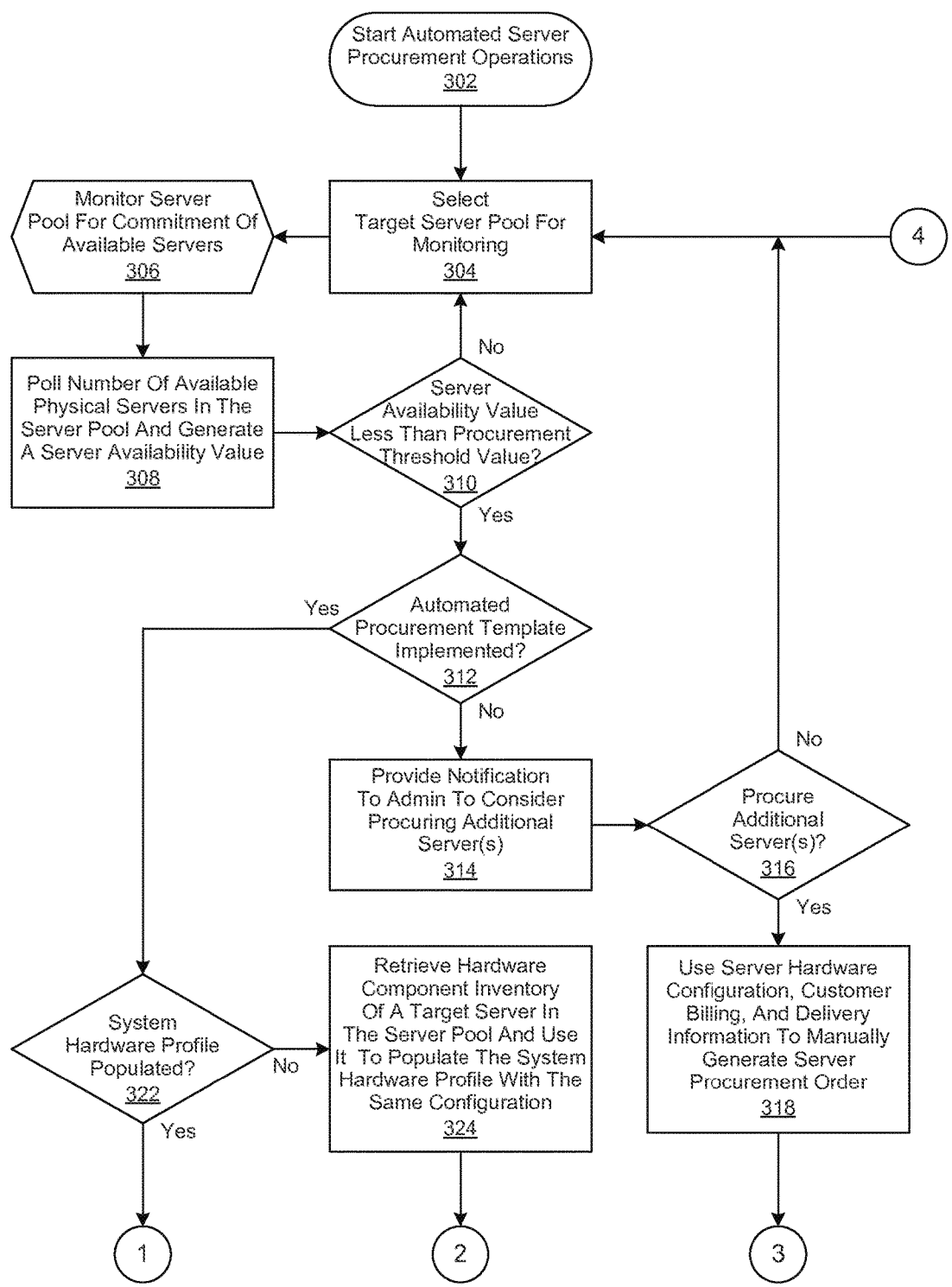
FIGS. 3a-b are a generalized flow chart of the performance of automated physical server procurement operations.
Figure 3B:
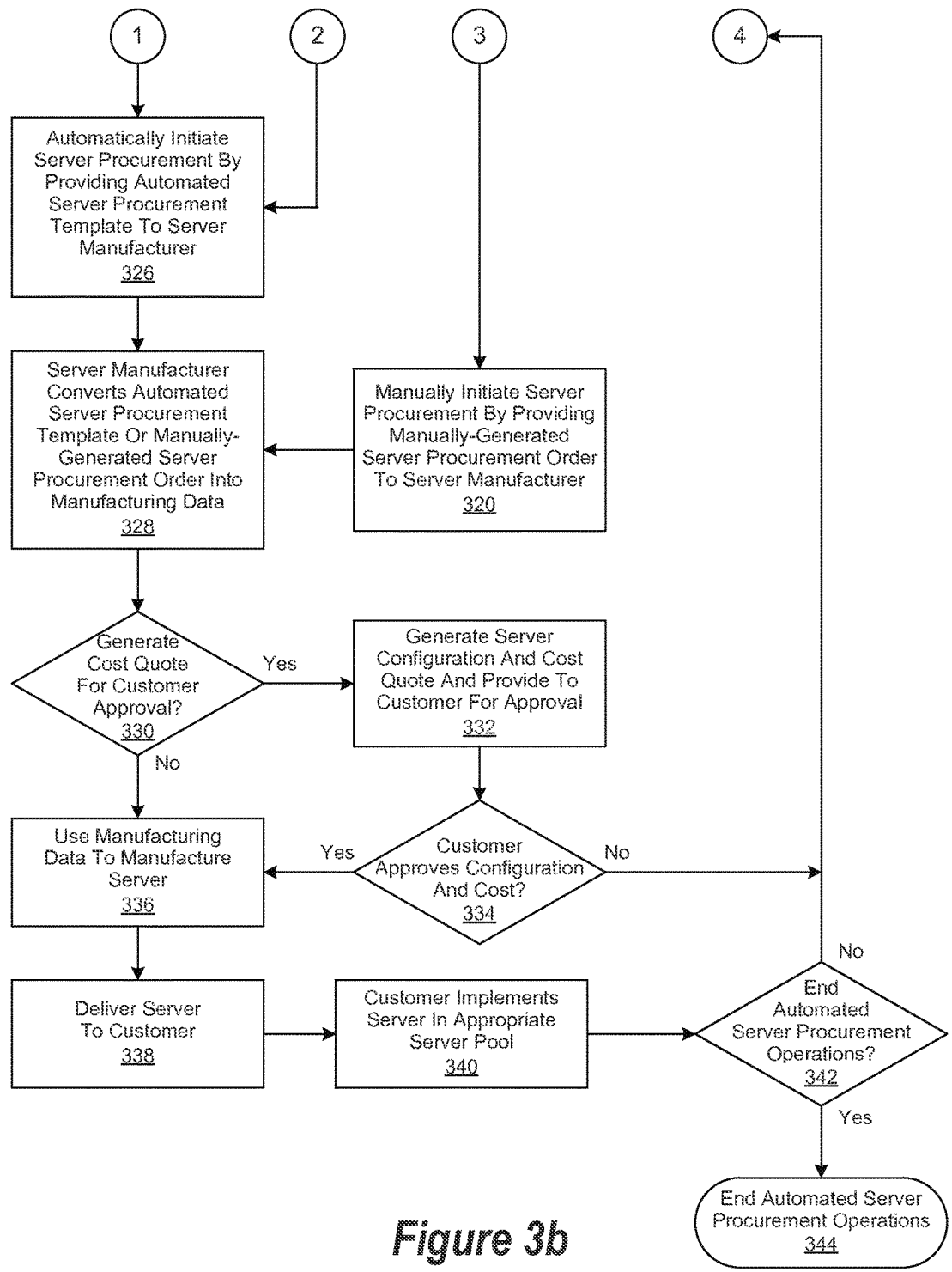

FIGS. 3*a-b* are a generalized flow chart of the performance of automated physical server procurement operations as implemented in an embodiment of the invention. In this embodiment, automated server procurement operations are begun in step 302, followed by the selection of a target pool of servers in 304. Once the target server pool is selected in step 304, it is monitored for commitment of available physical servers in step 306. Then, in step 308, the target server pool is polled to generate a server availability value, which is equivalent to the number of physical servers in the target server pool that are not currently committed.

A determination is then made in step 310 whether the server availability value is less than a procurement threshold value, which is a predetermined value that is equivalent to the lowest number of available physical servers to be maintained in the target server pool. If the server availability value is not less than the procurement threshold value, then the process is continued, proceeding with step 304. Otherwise, a determination is made in step 312 whether an automated procurement template has been implemented for the target server pool.

If it was determined in step 312 that an automated procurement template has not been implemented for the target server pool, then a notification is provided in step to a user, such as a system administrator, to consider procuring additional physical servers. A determination is then made in step 316 whether to procure additional physical servers. If not, then the process is continued, proceeding with step 304. Otherwise, server hardware configuration, customer billing, and associated delivery information is used in step 318 to manually generate a physical server procurement order. Procurement of physical server is then manually initiated by providing the manually-prepared physical server procurement order to the physical server manufacturer in step 320.

However, if it was determined in step 312 that an automated procurement template has been implemented for the target server pool, then a determination is made in step 322 whether the system hardware profile associated with the implemented automated procurement template has been populated. If not, then the system hardware profile is populated in step 324 by duplicating the hardware component inventory of a target physical server, as well as its associated configuration and customization data, that is a member of the target server pool. Thereafter, of after the system hardware profile is populated in step 322, procurement of a physical server is automatically initiated by providing the automated server procurement template to the physical server manufacturer in step 326.

Once the automated server procurement template or the manually-generated server procurement order has been respectively provided to the physical server manufacturer in steps 326 and 320, it is converted into manufacturing data by the physical server manufacturer in step 328. A determination is then made in step 330 whether to generate a physical server configuration and cost quote for the customer. If so, then it is generated and provided to the customer in step 332.

A determination is then made in step 334 whether the customer approves the physical server configuration and cost quote. If not, then the process is continued, proceeding with step 304. Otherwise, or if it was determined in step 330 not to generate a server configuration and cost quote, the manufacturing data is used by the physical server manufacturer to manufacture the physical server in step 338. The resulting physical server is then delivered to the customer in step 338 and subsequently implemented in the appropriate server pool in step 340. A determination is then made in step 342 whether to end automated server procurement operations. If not, the process is continued, proceeding with step 304. Otherwise, automate server procurement operations are ended in step 344.

Figure 4:
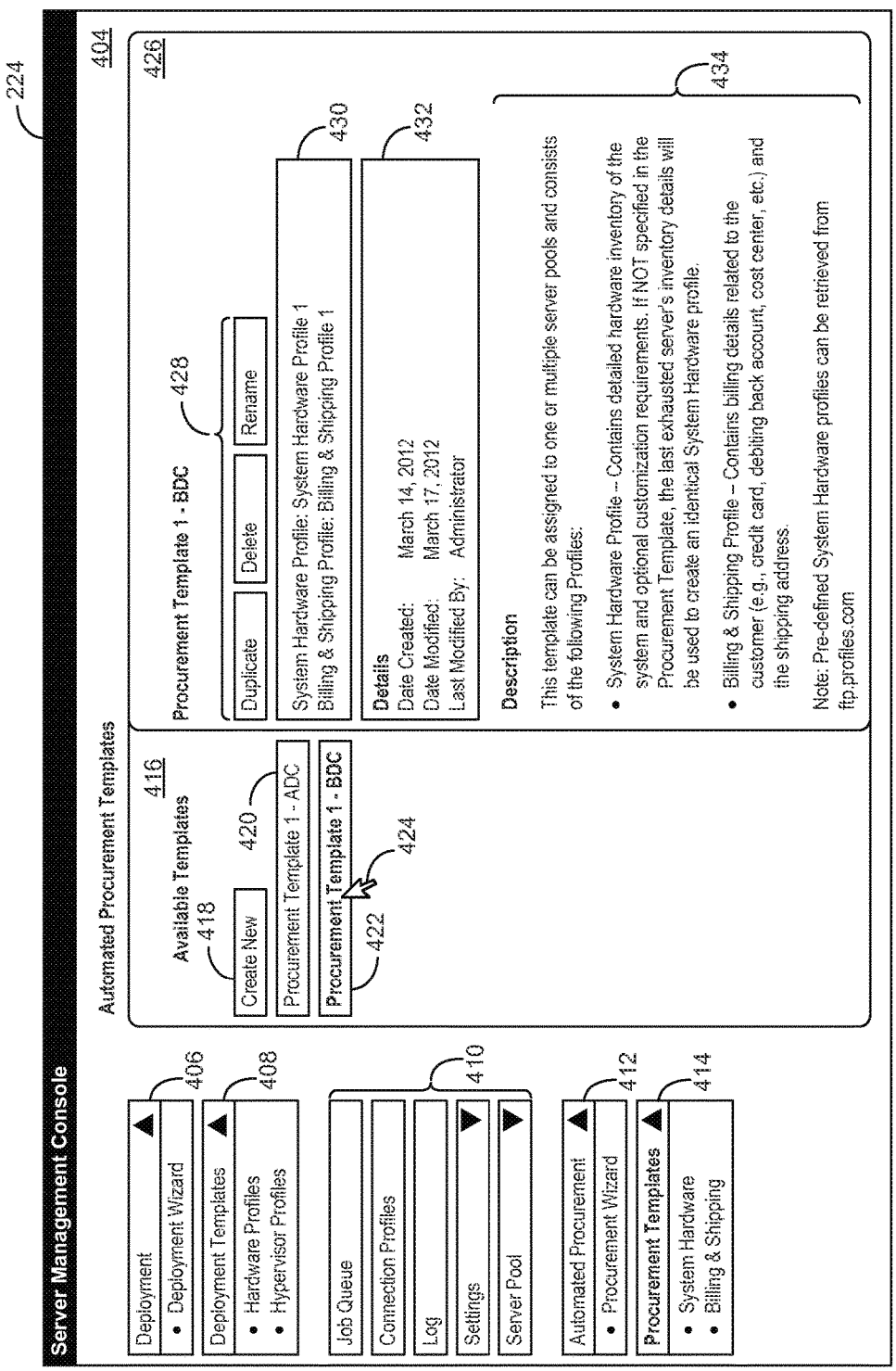
FIG. 4 shows the display of an automated server procurement template within a user interface window.

FIG. 4 shows the display of an automated server procurement template as implemented in an embodiment of the invention within a user interface window. In this embodiment, a user interface (UI) window 404 of a UI 224 comprises "Deployment" 406, "Deployment Templates" 408, "Automated Procurement" 412, and "Procurement Templates" 414 drop-down menus. As shown in FIG. 2, the UI window likewise comprises a plurality of server management control buttons and drop-down menus 410 as well as an "Available Templates" 416 sub-window, which in turn comprises an additional "Procurement Template 1—BDC" 426 sub-window.

Referring now to FIG. 2, the "Available Templates" 416 sub-window comprises a "Create New" 418 command button and "Procurement Template 1—ADC" and "Procurement Template 1—BDC" 422 automated procurement template selection buttons. As shown in FIG. 2, selection of the "Procurement Template 1—BDC" 422 automated procurement template selection button through a user gesture, such as a mouse click with pointer 424, has resulted in the display of the "Procurement Template 1—BDC" 426 sub-window. As likewise shown in FIG. 4, the "Procurement Template 1—BDC" 426 sub-window comprises a plurality of automated server procurement command buttons 428, system hardware and billing and shipping profile data 430, automated server procurement template metadata 432, and descriptive data 434 related to system hardware and billing and shipping profiles.

In various embodiments, as described in greater detail herein, an automated procurement template, such as that displayed within the "Procurement Template 1—BDC" 426 sub-window, is provided to a physical server manufacturer. In turn, the physical server manufacturer converts the information it contains into manufacturing and delivery data. The manufacturing data is then used to manufacture the physical server, which is then delivered to the customer for implementation.

Figure 5:
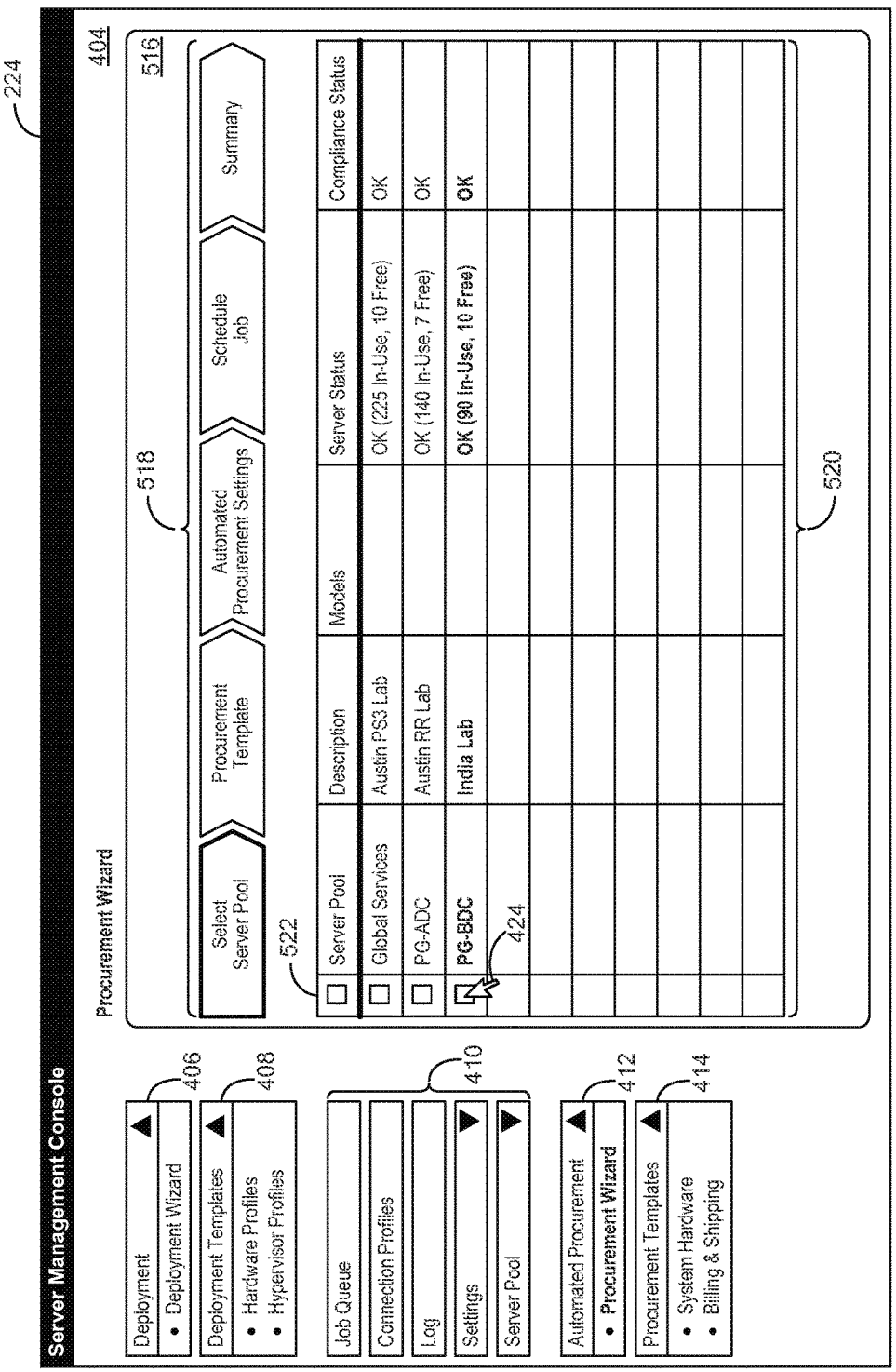
FIG. 5 shows the display of an automated server procurement wizard within a user interface window.

FIG. 5 shows the display of an automated server procurement wizard implemented in an embodiment of the invention within a user interface window. In this embodiment, a user interface (UI) window 404 of a UI 224 comprises "Deployment" 406, "Deployment Templates" 408, "Automated Procurement" 412, and "Procurement Templates" 414 drop-down menus. As shown in FIG. 2, the UI window likewise comprises a plurality of server management control buttons and drop-down menus 410 as well as a "Procurement Wizard" 516 sub-window. As likewise shown in FIG. 2, the "Procurement Wizard" 516 sub-window comprises a plurality of automated server procurement wizard 518 command buttons, and a plurality of server pool summary data 520. For example, the summary data associated with server pool "PG-BDC" is displayed by selecting the corresponding selection icon 522 through a user gesture, such as a mouse-click with pointer 424.

In various embodiments, as described in greater detail herein, an automated procurement template can be populated through the implementation of such an automated server procurement wizard. In these and other embodiments, the system hardware profiles and billing and shipping profiles may be populated to automate the procurement of a physical server when the remaining number of available servers in a server pool reaches a predetermined threshold value.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automating the procurement of a physical server, comprising:
  receiving a set of inventory data associated with a set of first physical servers, the set of inventory data comprising the number of first physical servers in the set of first physical servers available for commitment;
  processing the inventory data with a set of commitment data to generate a server availability value, the commitment data comprising data associated with the rate at which the number of available first physical servers is decreasing; performing comparison operations to compare the server availability value to a procurement threshold value; and
  performing a physical server procurement operation to initiate the procurement of a second physical server if the server availability value is less than the procurement threshold value; and
  wherein the set of inventory data further comprises a set of physical server configuration data comprising data associated with the configuration of an individual first physical server in the set of first physical servers, the set of physical server configuration data used in the performance of the physical server procurement operation;
  the individual first physical server comprises a physical server model that is no longer available;
  the second physical server comprises a successor physical server model; and
  the configuration of the second physical server is substantively equivalent to the configuration to the first physical server; and
  further comprising automatically initiating procurement of the physical server corresponding to the configuration of the second physical server by providing an automated server procurement template, wherein the automated procurement template is provided through at least one of Simple Object Access Protocol (SOAP), Representational State (REST)-based services, or Secure Sockets Layer (SSL).

2. The method of claim 1, wherein:
  manufacturing interval data and shipping duration time data is processed to generate a lead time, the manufacturing data and shipping time data is received from the manufacturer of the second physical server; and
  the lead time is used to determine when the physical server procurement operation is performed, the lead time comprising the amount of time before a target delivery date of the second physical server.

3. The method of claim 1, wherein the set of physical server configuration data is stored in an automated procurement template.

4. The method of claim 3, wherein the automated procurement template comprises:
  a server hardware configuration profile; and
  a billing and shipping profile.

5. A system comprising:
  a processor;
  a data bus coupled to the processor; and
  a non-transitory, computer-readable storage medium embodying computer program code, the non-transitory, computer-readable storage medium being coupled to the data bus, the computer program code interacting with a plurality of computer operations and comprising instructions executable by the processor and configured for:
  receiving a set of inventory data associated with a set of first physical servers, the set of inventory data comprising the number of first physical servers in the set of first physical servers available for commitment; processing the inventory data with a set of commitment data to generate a server availability value, the commitment data comprising data associated with the rate at which the number of available first physical servers is decreasing;
performing comparison operations to compare the server availability value to a procurement threshold value; and
performing a physical server procurement operation to initiate the procurement of a second physical server if the server availability value is less than the procurement threshold value; and
wherein the set of inventory data further comprises a set of physical server configuration data comprising data associated with the configuration of an individual first physical server in the set of first physical servers, the set of physical server configuration data used in the performance of the physical server procurement operation;
the individual first physical server comprises a physical server model that is no longer available;
the second physical server comprises a successor physical server model; and
the configuration of the second physical server is substantively equivalent to the configuration to the first physical server; and
automatically initiating procurement of the physical server corresponding to the configuration of the second physical server by providing an automated server procurement template, wherein the automated procurement template is provided through at least one of Simple Object Access Protocol (SOAP), Representational State (REST)-based services, or Secure Sockets layer (SSL).

6. The system of claim 5, wherein:
manufacturing interval data and shipping duration time data is processed to generate a lead time, the manufacturing data and shipping time data is received from the manufacturer of the second physical server; and
the lead time is used to determine when the physical server procurement operation is performed, the lead time comprising the amount of time before a target delivery date of the second physical server.

7. The system of claim 5, wherein the set of physical server configuration data is stored in an automated procurement template.

8. The system of claim 7, wherein the automated procurement template comprises:
a server hardware configuration profile; and
a billing and shipping profile.

9. A non-transitory, computer-readable storage medium embodying computer program code, the computer program code comprising computer executable instructions configured for:
receiving a set of inventory data associated with a set of first physical servers, the set of inventory data comprising the number of first physical servers in the set of first physical servers available for commitment;
processing the inventory data with a set of commitment data to generate a server availability value, the commitment data comprising data associated with the rate at which the number of available first physical servers is decreasing; performing comparison operations to compare the server availability value to a procurement threshold value; and
performing a physical server procurement operation to initiate the procurement of a second physical server if the server availability value is less than the procurement threshold value; and
wherein the set of inventory data further comprises a set of physical server configuration data comprising data associated with the configuration of an individual first physical server in the set of first physical servers, the set of physical server configuration data used in the performance of the physical server procurement operation;
the individual first physical server comprises a physical server model that is no longer available;
the second physical server comprises a successor physical server model; and
the configuration of the second physical server is substantively equivalent to the configuration to the first physical server; and
automatically initiating procurement of the physical server corresponding to the configuration of the second physical server by providing an automated server procurement template, wherein the automated procurement template is provided through at least one of Simple Object Access Protocol (SOAP), Representational State (REST)-based services, or Secure Sockets Layer (SSL).

10. The non-transitory, computer-readable storage medium of claim 9, wherein:
manufacturing interval data and shipping duration time data is processed to generate a lead time, the manufacturing data and shipping time data is received from the manufacturer of the second physical server; and
the lead time is used to determine when the physical server procurement operation is performed, the lead time comprising the amount of time before a target delivery date of the second physical server.

11. The non-transitory, computer-readable storage medium of claim 9, wherein the set of physical server configuration data is stored in an automated procurement template.

12. The non-transitory, computer-readable storage medium of claim 11, wherein the automated procurement template comprises:
a server hardware configuration profile; and
a billing and shipping profile.

* * * * *